July 12, 1927.
J. B. NEIL
COTTON PICKING MACHINE
Filed Dec. 2, 1924  2 Sheets-Sheet 1
1,635,725
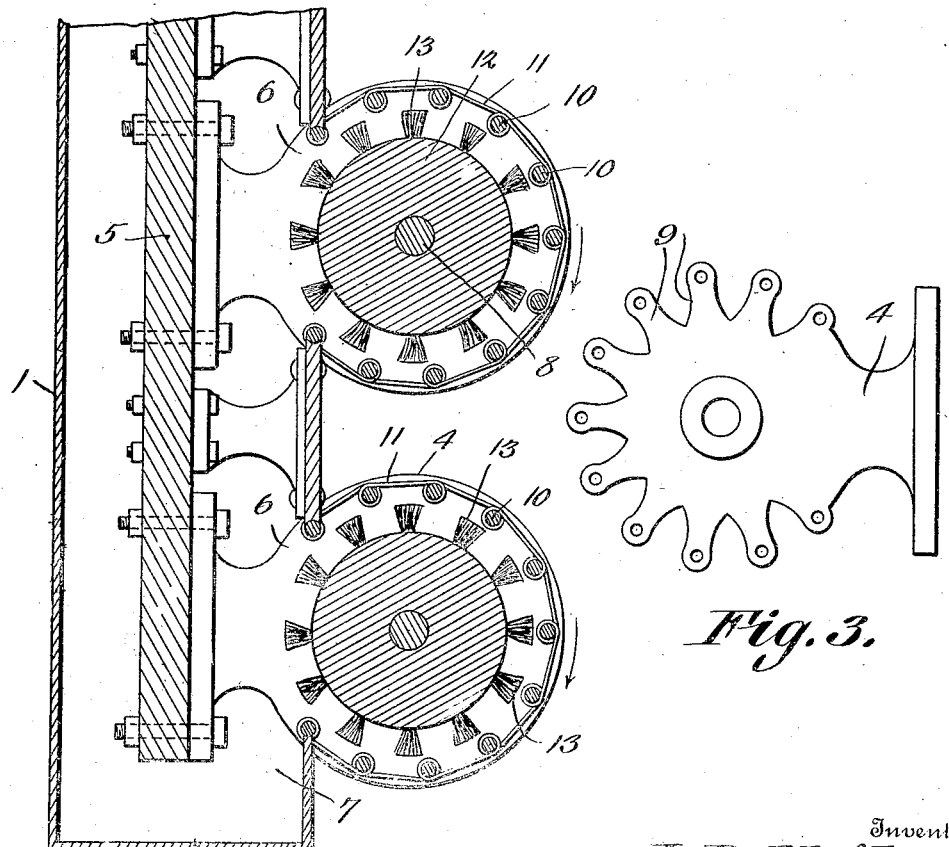
Inventor
J. B. Neil

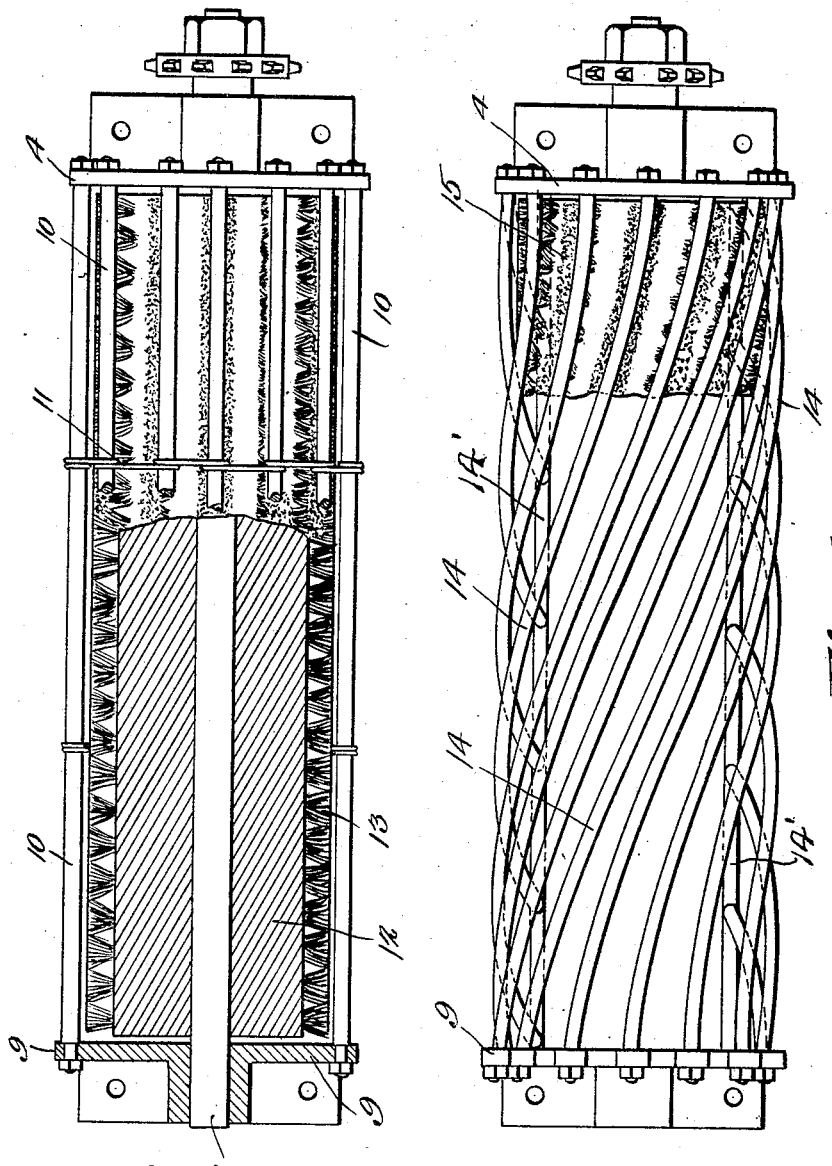

Patented July 12, 1927.

1,635,725

UNITED STATES PATENT OFFICE.

JOSEPH BROWN NEIL, OF YORK, SOUTH CAROLINA, ASSIGNOR OF ONE-THIRD TO C. L. COBB, OF ROCK HILL, SOUTH CAROLINA, AND ONE-THIRD TO J. C. WILBORN, OF YORK, SOUTH CAROLINA.

COTTON-PICKING MACHINE.

Application filed December 2, 1924. Serial No. 753,507.

This invention relates to machines for picking cotton, one of the objects being to provide a simple and compact machine which can be drawn along a row of plants in a field, the structure of the machine being such that the cotton fibers will be pulled from the plants and the leaves and other trash rejected.

Another object is to provide a machine of this character which is simple in construction, can be operated readily and, by reason of its light weight, will not plow into soft soil.

A further object is to provide a picking machine of this character which does not require the use of any suction fans, blowers or the like for disposing of the picked cotton.

A still further object is to provide simple and efficient means whereby all parts of the plant will be brought properly into position for engagement by the picking machine.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1 is a view more or less in diagram of a portion of a cotton picking machine having the present improvements combined therewith, said figure showing the opposed series of picking elements.

Fig. 2 is an enlarged vertical section through the lower portion of one series of picking elements.

Fig. 3 is a face view of one of the supporting brackets of a picking element.

Fig. 4 is a view partly in longitudinal section and partly in elevation of a picking element.

Fig. 5 is an elevation of the modified form of picking element, a portion of the brush being removed.

Referring to the figures by characters of reference 1 designates a housing suitably supported in a wheel supported frame 2, the housings being spaced apart a sufficient distance to receive between them the plants of a row straddled by the machine. In each of these housings is arranged a substantially vertical series of picking elements which have been indicated generally at 3 in Fig. 1, the picking elements of each series being duplicates. Consequently, a description of one of these picking elements will apply to all of them.

Each picking element includes end brackets 4 adapted to be secured to a central partition 5 within the housing 1 and extending through a longitudinal opening 6 formed in the inner wall of the housing 1. The bottom end and outer walls of the housing are preferably closed and cooperate with the partition 5 to form a flue 7 within the housing.

The brackets 4 of each picking element constitute bearings for a longitudinal shaft 8 and fingers 9 are extended radially from the rear bracket and serve to support the rear ends of guard rods 10, the front ends of which are mounted in the peripheral portion of the front bracket 4. These rods may be connected at intermediate points by wires 11 wrapped about the rods and extending around the picking element from one wall of the opening 6 to the opposite wall thereof as shown particularly in Fig. 2.

Secured to the shaft 8 is a roll 12 and extending from the roll are longitudinal series of brush bristles 13 which project close to the rods 10. The shafts 8 and the parts thereon can be rotated by any suitable mechanism provided for that purpose and in the present instance it has not been deemed necessary to illustrate this mechanism. It might be stated, however, that all of the rolls of each series rotate in the same direction. For example, if the rolls at one side of the machine rotate downwardly as indicated by the arrows in Figs. 1 and 2, the rolls of the other series of picking elements will also rotate downwardly as indicated by the arrow in Fig. 1.

If desired, a structure modified as shown in Fig. 5 can be used in lieu of the structure illustrated in Fig. 4. In this modified structure the rods 14 are extended spirally instead of longitudinally and a similar arrangement of the rows of brush bristles 15 can be provided on each roll. The ends of the rods 14 can be soldered or otherwise connected to longitudinal rods 14' which define the outlet opening for the cotton. This modified structure illustrated in Figure 5 can be provided with wires similar to the wires 11, if so desired.

As before stated, this machine is adapted to straddle a row of plants and to be moved longitudinally of the row. The portions of the plants containing the bolls will enter the spaces between the rods 10, and these rods, while sliding along the engaged portions, will hold them in proper relation to the picking brushes. As the rods move along the engaged portions of the plants, the rapidly rotating brushes will engage the fibers projecting into the cages formed by the rods and these fibers will be pulled out of the bolls and conveyed to the openings 6. Here the fibers will be expelled by centrifugal force and at the same time a strong air current will be set up by the fan-like action of the brushes, the air current being sufficient to blow the released fibers through the flue 7 to the outlet located at any suitable point in the machine. The rods 10 are so spaced that the cotton, during its movement with the brush, has no opportunity to be expelled therebetween but will, instead, move with the brush until reaching the openings 6.

The bristles of the brushes will of course engage only the fibers of the cotton and pull them into the cages. Leaves and twigs will not ordinarily be engaged and pulled into the cage by the brushes. Thus the cotton is kept relatively clean. The wires 11 not only serve to hold the rods properly spaced apart but also constitute means for agitating those portions of the plants engaged by the wires during the forward movement of the machine. This affords an opportunity for other portions of the plants to be brought where they can be engaged properly by the brushes.

By providing spiral rods 15 the branches of the plants will be given an upward movement and then released by the rods, this movement being intermittent so as to insure proper engagement of the bolls by the brushes.

It is preferred to rotate the brushes downwardly as shown because they thus act to throw downwardly and outwardly, leaves, twigs and other trash which should not be taken into the machine.

It will be noted that this machine is very simple, durable and compact and, because of its light construction, it can be used in a field under all weather conditions. There are no parts to become gummed or otherwise clogged by the plants as is often the case where saw teeth or similar picking elements are used.

What is claimed is:—

1. In a cotton picking machine, opposed series of superposed picking units, each unit including a cage having cotton receiving peripheral openings and a peripheral cotton outlet of greater width than any of said openings, and a rotatable picking brush mounted for rotation within the cage, said brush constituting means for expelling picked material through the outlet by centrifugal force, said peripheral openings being of such size as to prevent expulsion of cotton therethrough while travelling with the brush.

2. A cotton picking machine including opposed series of superposed picking units, each unit including connected spaced rods forming a cage having cotton receiving peripheral openings and a peripheral cotton outlet of greater width than any of said openings, housings communicating with the outlets of the respective series of cages, and picking brushes mounted for rotation within the housings for expelling picked material centrifugally through the outlets and into the housings, said peripheral openings being of such size as to prevent expulsion of cotton therethrough while travelling with the brush.

3. A cotton picking machine including opposed housings having outlet openings extending longitudinally thereof, a series of superposed picking units carried by each housing and projecting therebeyond, each unit including a cage opening into one of the outlets, each cage having cotton receiving peripheral openings, the outlet of each cage being wider than any one of said openings, and a picking brush mounted for rotation within each cage, said peripheral openings being of such size as to prevent expulsion of cotton therethrough while travelling with the brush.

4. A cotton picking machine including opposed housings having outlet openings in the inner sides thereof, a series of superposed picking units projecting from each housing, the units on each housing being extended toward the units on the opposed housing, each unit including end brackets, spaced rods connecting the brackets and forming a cage provided with peripheral cotton receiving openings between the rods, said cage communicating with one of the outlet openings, the outlet opening being of greater width than any one of the cotton receiving openings, and a picking brush mounted for rotation within the cage, the rods being so spaced as to prevent expulsion of cotton therebetween while rotating with the brush.

5. A cotton picking machine including opposed housings having longitudinal openings in their inner sides, a series of superposed picking units upon each housing, the units on one housing being extended toward the units on the other housing, each unit including end brackets, spaced rods connecting the brackets and forming a cage having an outlet formed by one of the openings in the housing, the openings between the rods constituting cotton receiving openings and each of said cotton receiving openings being of less width than the outlet of the cage, and a brush mounted for rotation within each cage, the rods being so spaced as to prevent expulsion of cotton therebetween while rotating with the brush.

6. A cotton picking machine including opposed housings having longitudinal openings in their inner sides, superposed picking units upon each housing, the units of each housing being extended toward the units on the opposed housing, each unit including end brackets, rods connecting the brackets and forming a cage, connections between intermediate portions of the rods, each of said cages opening into the housing, the openings between the rods constituting cotton receiving openings and each of said cotton receiving openings being of less width than the outlet of the cage, and a picking brush mounted for rotation within each cage, the rods being so spaced as to prevent expulsion of cotton therebetween while rotating with the brush.

7. In a cotton picking machine, opposed housings having longitudinal openings therein, and superposed picking elements projecting from each of the housings, each of said elements including end brackets, spirally disposed spaced rods connecting the brackets, and a picking brush mounted for rotation within each cage, each brush constituting picking and ejecting means.

In testimony that I claim the foregoing as my own, I have hereto affixed my signature.

JOSEPH BROWN NEIL.